(12) United States Patent
Meek et al.

(10) Patent No.: US 9,928,181 B2
(45) Date of Patent: Mar. 27, 2018

(54) SYSTEMS AND METHODS FOR PROTECTION OF REFLECTIVE MEMORY SYSTEMS

(71) Applicants: Oscar L. Meek, Wilmington, NC (US); Gregory S. Droba, Hampstead, NC (US)

(72) Inventors: Oscar L. Meek, Wilmington, NC (US); Gregory S. Droba, Hampstead, NC (US)

(73) Assignee: GE-HITACHI NUCLEAR ENERGY AMERICAS, LLC, Wilmington, NC (US)

(*) Notice: Subject to any disclaimer, the term of this patent is extended or adjusted under 35 U.S.C. 154(b) by 401 days.

(21) Appl. No.: 14/550,143

(22) Filed: Nov. 21, 2014

(65) Prior Publication Data

US 2016/0147674 A1 May 26, 2016

(51) Int. Cl.
*G06F 12/14* (2006.01)
*G06F 3/06* (2006.01)
(Continued)

(52) U.S. Cl.
CPC .......... *G06F 12/1458* (2013.01); *G06F 3/062* (2013.01); *G06F 3/0653* (2013.01); *G06F 3/0683* (2013.01); *G06F 11/073* (2013.01); *G06F 11/0751* (2013.01); *G06F 11/1666* (2013.01); *G06F 11/0796* (2013.01); *G06F 11/20* (2013.01); *G06F 2212/1052* (2013.01)

(58) Field of Classification Search
None
See application file for complete search history.

(56) References Cited

U.S. PATENT DOCUMENTS 5,984,504 A 11/1999 Doyle et al.
6,640,245 B1 10/2003 Shen et al.
(Continued)

FOREIGN PATENT DOCUMENTS

WO 2008040066 A1 4/2008
WO 2013165379 A1 11/2013

OTHER PUBLICATIONS

European Search Report and Opinion issued in connection with corresponding EP Application No. 15194690.2 dated May 17, 2016.

*Primary Examiner* — Adam M Queler
*Assistant Examiner* — Dustin Bone
(74) *Attorney, Agent, or Firm* — Harness, Dickey & Pierce, PLC (57) ABSTRACT

A computing device within a reflective memory system includes a memory block and a special purpose processor. The memory block includes a plurality of memory areas, which are configured to store data of a corresponding one of a plurality of external devices. The special purpose processor is configured to intercept a write request. The write request is associated with a first external device of the plurality of external devices, and the first external device is associated with a first memory area of the plurality of memory areas. The special purpose processor is configured to determine whether the write request is valid or invalid, write the data of the first external device to the first memory area if the write request is valid, and prevent the data of the first external device from being written to the memory block if the write request is invalid.

20 Claims, 5 Drawing Sheets

(51) Int. Cl.
*G06F 11/07* (2006.01)
*G06F 11/16* (2006.01)
*G06F 11/20* (2006.01)

(56) References Cited

U.S. PATENT DOCUMENTS

| | | | |
|---|---|---|---|
| 2003/0163653 A1* | 8/2003 | Skendzic | G06F 11/1666 |
| | | | 711/153 |
| 2013/0177017 A1 | 7/2013 | Elliott et al. | |
| 2014/0201314 A1* | 7/2014 | Borkenhagen | G06F 11/1666 |
| | | | 709/216 |
| 2014/0372694 A1* | 12/2014 | Young | G06F 12/0804 |
| | | | 711/113 |
| 2016/0034366 A1* | 2/2016 | Anglin | G06F 11/1458 |
| | | | 714/4.11 |
| 2016/0063281 A1* | 3/2016 | Kahana | G06F 21/71 |
| | | | 726/27 |

* cited by examiner

SYSTEMS AND METHODS FOR PROTECTION OF REFLECTIVE MEMORY SYSTEMS

BACKGROUND

The subject matter disclosed herein relates to reflective memory systems, and more particularly, protection methods and systems for reflective memory systems.

Reflective memory systems may be used for a variety of distributed simulation and industrial control applications. A reflective memory system is a network of computing devices, where each computing device includes a shared memory block and an up-to-date local copy of the shared data. The shared memory block may be one or more areas of a memory device that can be accessed by the computing devices within the reflective memory system. For example, a first computing device in a reflective memory system may write data to its local shared memory block, which is then written to the shared memory block of a second computing device in the reflective memory system. Additionally, the computing devices within a reflective memory system may read or otherwise access the data stored in the shared memory block of other computing devices within the reflective memory system. The physical and/or logical structure of each local shared memory block that is common to each computing device within the reflective memory system may be referred to as a "reflective memory", a "reflective memory area", and the like.

Since each computing device can write to the local shared memory block of other computing devices within the reflective memory system, a computing device could overwrite data received from another computing device thereby corrupting the information in the reflective memory. Typical precautions against data corruption include using software applications to monitor the reflective memory and update the reflective memory if the data within the reflective memory does not match the data within a local shared memory block. However, using software applications to prevent or reduce data corruption may require relatively large amounts of data processing resources and/or network resources. Additionally, such software applications may be subject to common cause failures and/or software malfunctions.

Thus, there exists a demand for a solution allowing an improvement over existing reflective memory protection systems. There is a demand to provide a reflective memory system that alleviates the need for one or more processors to compare a reflective memory versus a local shared memory block. Furthermore, there is a demand for hardware based reflective memory protection systems that provide diverse means of preventing memory corruption and mitigates common cause failures due to software malfunctions.

SUMMARY

At least one example embodiment relates to a computing device within a reflective memory system.

According to at least one example embodiment, a computing device within a reflective memory system includes a memory block and a special purpose processor. The memory block includes a plurality of memory areas, where each of the plurality of memory areas are configured to store data of a corresponding one of a plurality of external devices. The special purpose processor is configured to intercept a write request. The write request is associated with a first external device of the plurality of external devices, and the first external device is associated with a first memory area of the plurality of memory areas. The special purpose processor is configured to determine whether the write request is valid, and write the data of the first external device to the first memory area if the determining determines that the write request is valid.

At least one example embodiment provides that in the determining, the special purpose processor is configured to determine that the write request is valid if the write request indicates to write data of the first external device to the first memory area, and determine that the write request is invalid if the write request indicates to write data of the first external device to another one of the plurality of memory areas.

At least one example embodiment provides that the special purpose processor is further configured to prevent the data of the first external device from being written to the first memory area if the determining determines that the write request is invalid.

At least one example embodiment provides that the special purpose processor is further configured to transmit a second write request to a second computing device within the reflective memory system. The second computing device includes a second memory block and a second special purpose processor. The second memory block includes a second plurality of memory areas, where each of the second plurality of memory areas are configured to store data of corresponding ones of the plurality of external devices. The second special purpose processor configured to intercept the second write request, determine whether the second write request is valid, and write the data of the first external device to a first memory area of the second plurality of memory areas if the determining determines that the second write request is valid.

At least one example embodiment provides that the first memory area of the second plurality of memory areas having a same memory address as the first memory area of the first plurality of memory areas.

At least one example embodiment provides that the computing device further includes a general purpose processor, and in the intercepting, the special purpose processor is configured to obtain the write request from the general purpose processor.

At least one example embodiment provides that the computing device further includes a network interface, the computing device is connected to the first external device via the network interface, and the general purpose processor issues the write request based on data received from the first external device.

At least one example embodiment provides that the computing device further includes a network interface, and in the intercepting, the special purpose processor is configured to obtain the write request from another computing device within the reflective memory system via the network interface.

At least one example embodiment provides that the general purpose processor is configured to obtain a read request from the other computing device, the read request indicating to read data from at least one of the plurality of memory areas; and provide the data to the other computing device according to the obtained read request.

At least one example embodiment provides that in the intercepting, the special purpose processor is further configured to initiate a data refresh timer; determine whether the data refresh timer has expired before the special purpose processor has intercepted another write request; and trigger a safety system if the data refresh timer has expired.

At least one example embodiment relates to a method for writing data to a designated area within a reflective memory system.

According to at least one example embodiment, a method is provided for writing data to a designated one of a plurality of memory areas in a memory block of a computing device within a reflective memory system, where each of the plurality of memory areas is configured to store data of a corresponding one of a plurality of external devices. The method includes intercepting a write request, the write request being associated with a first external device of the plurality of external devices, the first external device being associated with a first memory area of the plurality of memory areas; determining whether the write request is valid; and writing the data of the first external device to the designated memory area if the determining determines that the write request is valid.

At least one example embodiment provides that the determining includes determining that the write request is valid if the write request indicates to write data of the first external device to the designated memory area; and determining that the write request is invalid if the write request indicates to write data of the first external device to another one of the plurality of memory areas.

At least one example embodiment provides that the method further includes preventing the data of the first external device from being written to the first memory area if the determining determines that the write request is invalid.

At least one example embodiment provides that the method further includes transmitting a second write request to a second computing device within the reflective memory system, the second computing device including a second memory block including a second plurality of memory areas, each of the second plurality of memory areas being configured to store the data of the corresponding ones of the plurality of external devices. The second write request indicates to write the data of the first external device to a first memory area of the second plurality of memory areas if a second special purpose processor of the second computing device determines that the second write request is valid.

At least one example embodiment provides that the first area of the second plurality of memory areas has a same memory address as the first memory area of the plurality of memory areas.

At least one example embodiment provides that the intercepting includes obtaining the write request from a general purpose processor, the general purpose processor issues the write request based on data received from the first external device.

At least one example embodiment provides that the intercepting includes obtaining the write request from another computing device within the reflective memory system.

At least one example embodiment provides that the general purpose processor obtains a read request from the other computing device, where the read request indicates to read data from at least one of the plurality of memory areas; and the general purpose processor provides the data to the other computing device according to the obtained read request.

At least one example embodiment provides that the intercepting includes initiating a data refresh timer; determining whether the data refresh timer has expired before the special purpose processor has intercepted another write request; and triggering a safety system if the data refresh timer has expired.

At least one example embodiment relates to a reflective memory system.

According to at least one example embodiment, a reflective memory system includes at least a first computing device and a second computing device. The first memory device includes a first memory block and a first special purpose processor. The first memory block includes a first plurality of memory areas, where each of the first plurality of memory areas are configured to store data of a corresponding one of a plurality of external devices. The first special purpose processor is configured to intercept a write request. The write request is associated with a first external device of the plurality of external devices, and the first external device is associated with a first memory area of the first plurality of memory areas. The first special purpose processor is configured to determine whether the write request is valid, write the data of the first external device to the first memory area if the determining determines that the write request is valid, and transmit the write request to a second computing device. The second computing device includes a second memory block and a second special purpose processor. The second memory block includes a second memory block including a second plurality of memory areas, where each of the second plurality of memory areas are configured to store data of corresponding ones of the plurality of external devices. The second special purpose processor configured to intercept the write request, determine whether the write request is valid, and write the data of the first external device to a first memory area of the second plurality of memory areas if the determining determines that the write request is valid. At least one example embodiment provides that the first memory area of the second plurality of memory areas has a same memory address as the first memory area of the first plurality of memory areas.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION OF EMBODIMENTS

Various example embodiments will now be described more fully with reference to the accompanying drawings in which some example embodiments of the invention are shown.

Detailed illustrative embodiments are disclosed herein. However, specific structural and functional details disclosed herein are merely representative for purposes of describing example embodiments of the present invention. This invention may, however, may be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Figure 1:
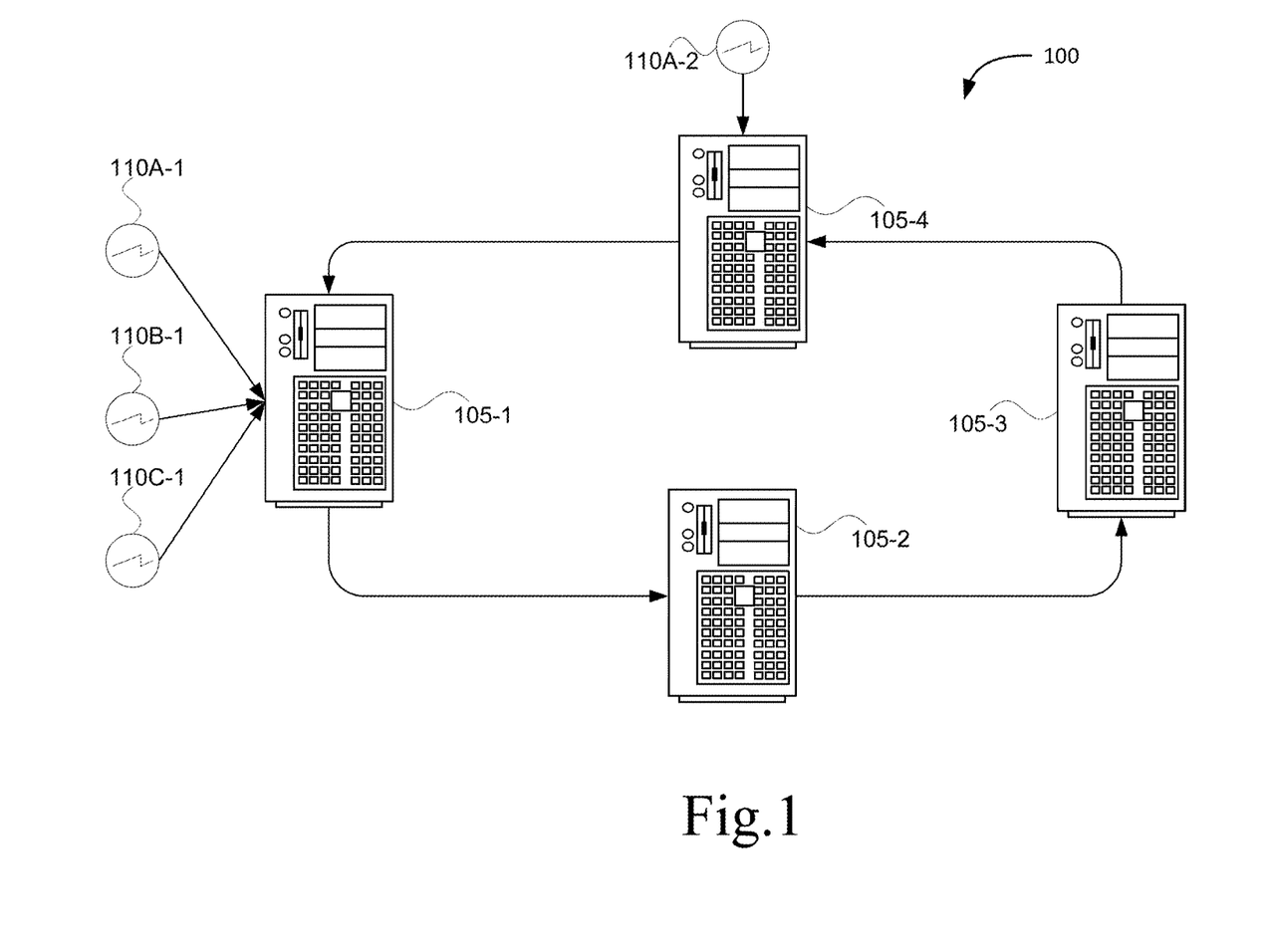
FIG. 1 illustrates an illustrates an example of a reflective memory system according to an example embodiment.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular data types. The program modules and functional processes discussed herein may be implemented using existing hardware in existing communication networks. For example, program modules and functional processes discussed herein may be implemented using existing hardware at existing network elements or control nodes (e.g., computing devices 105 as shown in FIG. 1). Such existing hardware may include one or more digital signal processors (DSPs), application-specific-integrated-circuits, field programmable gate arrays (FPGAs) computers or the like.

FIG. 1 illustrates an example of a reflective memory system 100, according to an example embodiment. The reflective memory system 100 includes computing devices 105 and data generating devices 110.

According to various embodiments, each of the computing devices 105 may be hardware computing device capable of communicating with the other computing devices 105 in the reflective memory system 100. Computing devices 105 may include memory, one or more general processors, one or more special purpose processors, and a network interface. Computing devices 105 may be configured to send/receive data to/from other computing devices 105 via network devices, such as a router, switch, or other like network devices, via a wired or wireless connection (not shown). Computing devices 105 may be designed to sequentially and automatically carry out a sequence of arithmetic or logical operations; equipped to record/store digital data on a machine readable medium; and transmit and receive digital data via one or more network devices. Computing devices 105 may be any physical or logical device capable of recording, storing, and/or transferring digital data via a network connection.

In various embodiments, each of the computing devices 105 may include a network interface configured to connect each computing device 105 to other computing devices 105 and/or to one or more other hardware computing devices (e.g., data generating devices 110, one or more associated databases (not shown), etc.) wirelessly via a transmitter and a receiver (or optionally a transceiver) and/or via a wired connection using a communications port. Computing devices 105 may be configured to send/receive data to/from one or more other hardware computing devices and/or network devices, such as a router, switch, or other like network devices, via the network interface using the wired connection and/or the wireless connection.

According to various embodiments, the computing devices 105 may communicate with each other via network. The network may be the Internet, a Wide Area Network (WAN) or other like network that covers a broad area, such as a personal area network (PAN), local area network (LAN), campus area network (CAN), metropolitan area network (MAN), a virtual local area network (VLAN), and/or other like networks capable of physically or logically connecting computing devices 105.

According to various embodiments, one or more of the computing devices 105 may include one or more local and/or remote databases (not shown). In various embodiments, the one or more databases may include a database management system (DBMS). The one or more databases may include a relational database management system (RDBMS). In other embodiments, alternate DBMS may also be used, such as an object database (ODBMS), column-oriented DBMS, correlation database DBMS, federated database system (FDBS), and the like. According to various embodiments, the one or more databases may be stored on or otherwise associated with one or more data storage devices. These data storage devices may include at least one of a primary storage device, a secondary storage device, a tertiary storage device, a non-linear storage device, and/or other like data storage devices. Furthermore, the one or more databases may include one or more virtual machines, such that the physical data storage devices containing the one or more databases may be logically divided into multiple virtual data storage devices and/or databases. Alternatively, each of the one or more databases may reside on one physical hardware data storage device.

In various embodiments, the data storage devices of each of the computing devices 105 may include a local shared memory block. The local shared memory block of each of the computing devices 105 may be read and/or accessed by other ones of the computing devices 105. Additionally, when data is written to the local shared memory block of one of the computing devices 105, the written data may be sent to another one of the computing devices 105. In various embodiments, the data may be written to the local shared memory block while simultaneously sending the data to the next computing device in the reflective memory system.

Data generating devices 110 may be computing devices or a system of computing devices, sensors, meters, or other like apparatuses that can capture and/or record data associated with an event. According to example embodiments, each of the data generating devices 110 may be configured to measure one or more physical phenomena, such as measuring temperature, pressure, motion force, load, position, chemicals/gases, sound/vibrations, and the like. Additionally, the data generating devices 110 may be configured to receive, record, and/or store manually entered data and/or digital data generated by one or more other external devices. Once data associated with an event is captured and recorded, the data may be reported to an application or software program and relayed through a network to be stored in a local shared memory block of a corresponding computing device 105. Data generating devices 110 may also be configured to receive data requests and/or control data from one or more of the computing devices 105. In various embodiments, each of the data generating devices 110 may be configured to communicate with one or more of the computing devices 105 via a wired or wireless network. In such embodiments, each of the data generating devices 110 may include a network interface configured to operate in accordance with one or more wired communications standards and/or one or more wireless communications standards. In various embodiments, data generating devices 110 may be Machine Type Communications (MTC) devices, which are devices that require little (or no) human intervention to communicate with other devices (e.g., computing devices 105, and/or other like devices). It should be noted that MTC devices may also be referred to as Machine-to-Machine (M2M) communications devices.

In various embodiments, the computing devices 105 may be configured to query one or more associated data generating devices 110. In such embodiments, the computing devices 105 may query the one or more associated data generating devices 110 on a periodic basis (e.g., once per month, at a desired time of day, and/or the like). In various embodiments, the computing devices 105 may be configured to page one or more associated data generating devices 110 in response to receiving a request via an input device or from one or more remote client devices. In various embodiments, computing devices 105 may be configured to receive a message, alert, flag, or any other type of indication from an associated one or more data generating devices 110 indicating that data has been generated after an event has occurred. In various embodiments, the data generating devices 110 may be configured to generate data on a periodic cycle (e.g., once per month, at a desired time of day, and/or the like) and report the generated data at a frequency of the periodic cycle without being queried. Additionally, computing devices 105 may be configured to monitor one or more data generating devices 110 for generated data using any other known method.

According to various embodiments, each of the data generating devices 110 may be associated with one or more memory areas within a local shared memory block of a corresponding computing device 105. For example, the data generating device 110A-1 may be designated to, or otherwise associated with a first memory area of a local shared memory block (e.g., reflective memory area-1 261 of shared memory block 260 discussed with regard to FIG. 2); the data generating device 110B-1 may be designated to, or otherwise associated with a second memory area of the local shared memory block (e.g., reflective memory area-2 261 of shared memory block 260 discussed with regard to FIG. 2); the data generating device 110C-1 may be designated to, or otherwise associated with a third memory area of the local shared memory block (e.g., reflective memory area-3 261 of shared memory block 260 discussed with regard to FIG. 2); and the data generating device 110A-2 may be designated to, or otherwise associated with a fourth memory area of the local shared memory block (e.g., reflective memory area-4 261 of shared memory block 260 discussed with regard to FIG. 2). In various embodiments, each of the data generating devices 110A may be associated with a same memory area on each of the computing devices 105.

According to a non-limiting example embodiment, the reflective memory system 100 may operate as follows. According to the first non-limiting example embodiment, the computing device 105-1 may include shared memory block 260, which is discussed in detail with regard to FIG. 2. The data generating device 110A-1 may obtain data associated with a first event, and the data generating device 110A-1 may be associated with the reflective memory area-1 261, which is discussed in detail with regard to FIG. 2.

When the data generating device 110A-1 captures data associated with the first event, the data associated with the first event may be transmitted or otherwise obtained by the computing device 105-1. The computing device 105-1 stores the data associated with the first event in the reflective memory area-1 261 of the local shared memory block of the computing device 105-1 (i.e., shared memory block 260).

When the computing device 105-1 stores the data associated with the first event in the reflective memory area-1 261, the computing device 105-1 transmits a write request to a next node in the reflective memory system 100. According to the non-limiting example embodiment, the next node in the reflective memory system 100 is computing device 105-2.

The computing device 105-1 transmits a write request to the computing device 105-2 to store the data associated with the first event in a local shared memory block of the computing device 105-2. According to various embodiments, the local shared memory block of the computing device 105-2 has the same physical and/or logical structure as the local shared memory block of the computing device 105-1 (i.e., Shared memory block 260). Thus, according to the non-limiting example embodiment, the computing device 105-2 writes the data associated with the first event to the reflective memory area-1 261 of the local shared memory block of the computing device 105-2 (i.e., shared memory block 260).

According to various embodiments, the computing device 105-2 may determine whether the write request from the computing device 105-1 is valid or invalid prior to writing the data associated with the first event in the local shared memory block of the computing device 105-2. In embodiments where each computing device in the reflective memory system has the same physical and/or logical structure, the validity of the write request may be based on a memory address included in the write request. Accordingly, the computing device 105-2 may determine that the write request from computing device 105-1 is valid if the write request indicates to write the data associated with the first event to a memory area of the local shared memory block designated for the data generating device 110A-1. The computing device 105-2 may determine that the write request from computing device 105-1 is invalid if the write request indicates to write the data associated with the first event to a memory area of the local shared memory block other than the memory area designated for the data generating device 110A-1. In this way, the computing device 105-2 may reduce the likelihood of data corruption within the reflective memory system 100.

When the computing device 105-2 writes the data associated with the first event to the reflective memory area-1 261 of the local shared memory block of the computing device 105-2, the computing device 105-2 transmits a write request to the next node in the reflective memory system 100, which is computing device 105-3. The computing device 105-3 may write the data associated with the first event to a same memory area of a local shared memory block of the computing device 105-3 in the same manner as discussed above with regard to computing device 105-2. Additionally, the computing device 105-3 may determine the validity or invalidity of the write request from the computing device 105-2 in a similar manner as discussed above with regard to the computing device 105-2.

When the computing device 105-3 writes the data associated with the first event to the reflective memory area-1 261 of the local shared memory block of the computing device 105-3, the computing device 105-3 transmits a write request to the next node in the reflective memory system 100, which is computing device 105-4. The computing device 105-4 may write the data associated with the first event to a same memory area of a local shared memory block of the computing device 105-4 in the same manner as discussed above with regard to computing devices 105-2 and 105-3. Additionally, the computing device 105-3 may determine the validity or invalidity of the write request from the computing device 105-4 in a similar manner as discussed above with regard to the computing device 105-2 and 105-3.

As shown in FIG. 1, only four computing devices 105 and a four data generating devices 110 are present. According to various embodiments, many more computing devices and/or data generating devices may be present. Additionally, the reflective memory system 100 may include any combination of computing devices and/or generating devices.

Figure 2:
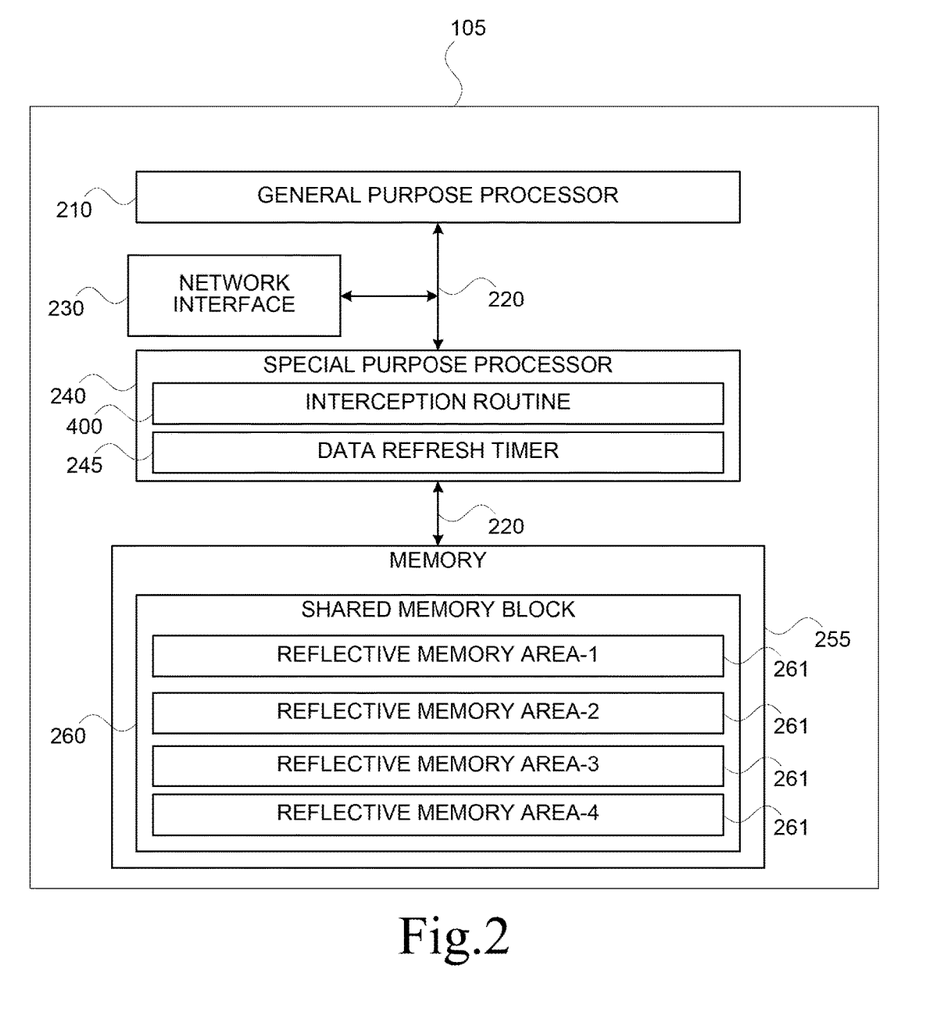
FIG. 2 illustrates the components of a computing device within the reflective memory system of FIG. 1 according to an example embodiment.

FIG. 2 illustrates the components of a computing device 105 that may be employed by the reflective memory system 100 according to an example embodiment. As shown, computing device 105 includes general purpose processor 210, bus 220, network interface 230, special purpose processor 240, and memory 255. As shown in FIG. 2, memory 255 includes a shared memory block 260, which includes reflective memory areas 261. During operation, special purpose processor 240 includes interception routine 400 and data refresh timer 245. In some embodiments, computing device 105 may include many more components than those shown in FIG. 2, such as a display device, one or more input devices, a transmitter/receiver (or alternatively, a transceiver), and the like. However, it is not necessary that all of these generally conventional components be shown in order to disclose the example embodiments.

Memory 255 is a hardware device configured to store an operating system (not shown) and program code for one or more software components, such as interception routine 400 and/or other like software applications. Memory 255 may be a computer readable storage medium that includes a random access memory (RAM), read only memory (ROM), a flash memory device, a solid state disk (SSD), and/or any other like storage media capable of storing and recording data. The program code and/or software components may also be loaded from a separate computer readable storage medium into memory 255 using a drive mechanism (not shown). Such separate computer readable storage medium may include a Blu-Ray/DVD/CD-ROM drive, memory card, removable flash drive, and/or other like computer readable storage medium (not shown). In some embodiments, software components may be loaded into memory 255 via network interface 230, rather than via a computer readable storage medium.

As shown in FIG. 2, memory 255 includes a shared memory block 260, which includes reflective memory areas 261. The shared memory block 260 may be read and/or accessed by the general purpose processor 210 and/or other computing devices 105 within the reflective memory system

100. Additionally, the general purpose processor 210 and/or other computing devices 105 within the reflective memory system 100 may write data to the shared memory block 260 by way of a write request. Additionally, shared memory block 260 also includes a plurality of reflective memory areas 261. Each of the plurality of reflective memory areas 261 are configured to store data that is generated by a corresponding one of a plurality of external devices (e.g., data generating devices 110). According to various embodiments, each of the data generating devices 110 is associated with one or more of the reflective memory areas 261 within the shared memory block 260. The designation of a data generating device 110 to one or more of the reflective memory areas 261 may be based on one or more system design choices and/or may be determined based on empirical studies.

As noted previously, each of the computing devices 105 in the reflective memory system 10 includes a local version of the shared memory block 260. In various embodiments, each local version of the shared memory block 260 may be physically and/or logically identical, such that each local version of the shared memory block 260 has the same physical and/or logical structure as each other local version of the shared memory block 260. Therefore, each of the plurality of reflective memory areas 261 of each local version of the shared memory block 260 may have the same memory address within each other local version of the shared memory block 260. For example, the reflective memory area-1 261 residing within the shared memory block 260 of computing device 105-1 may have a same memory address as a reflective memory area-1 261 residing within the shared memory block 260 of computing device 105-2. Therefore, according to various embodiments, each of the data generating devices 110 may be associated with a same reflective memory area 261 on each of the computing devices 105.

General purpose processor 210 is a computer processing device that is configured to carry out instructions of a computer program by performing basic arithmetical, logical, and input/output operations of the computing device 105. The general purpose processor 210 may include a single-core processor, a dual-core processor, a triple-core processor, a quad-core processor, etc. The general purpose processor 210 may perform a variety of functions for the computing device 105 and may process data by executing program code, one or more software modules, firmware, middleware, microcode, hardware description languages, and/or any other like set of instructions stored in the memory 255. The program code may be provided to the general purpose processor 210 by memory 255 via bus 220, one or more drive mechanisms (not shown), and/or via network interface 230. In order to perform the variety of functions and data processing operations, the program code and/or software components are loaded into the processor 210.

Special purpose processor 240 is a computer processing device that is configured to carry out instructions of a computer program by performing arithmetical, logical, and input/output operations of the computing device 105. The special purpose processor 240 may be designed or otherwise configured to carry out one or more specialized tasks according to the example embodiments. The special purpose processor 240 may be a field programmable gate array (FPGA), a peripheral interface controller (PIC), a digital signal processor (DSP), and/or any other like processing device that may be customized or otherwise configurable for specialized tasks. The special purpose processor 240 may perform a variety of functions for the computing device 105 and may process data by executing program code, one or more software modules, firmware, middleware, microcode, hardware description languages, and/or any other like set of instructions permanently stored in an internal memory of the special purpose processor 240 (not shown). In some embodiments, the program code may be provided to the special purpose processor 240 by memory 255 via bus 220, one or more drive mechanisms (not shown), and/or via network interface 230. In such embodiments, once the program code is loaded into the special purpose processor 240, the special purpose processor 240 may be programmed to perform the various operations and functions delineated by the program code, thereby transforming the special purpose processor 240 into a special purpose processor.

During operation, special purpose processor 240 includes interception routine 400. When the special purpose processor 240 executes the interception routine 400, the special purpose processor 240 may be configured to intercept a write request in order to determine whether the write request is valid or invalid. The write request may be generated by the general purpose processor 210 or may be received from another computing device 105 within the reflective memory system 100 via the network interface 230. The special purpose processor 240 is configured to determine that the write request is valid if the write request indicates to write data of a data generating device 110 to a designated one of the plurality of reflective memory areas 261. The special purpose processor 240 may be configured to determine that the write request is invalid if the write request indicates to write data of a data generating device 110 to any other non-designated one of the plurality of reflective memory areas 261. The special purpose processor 240 is also configured to block or otherwise prevent the data from being written to the shared memory block 260 if the special purpose processor 240 determines that the write request is invalid.

Additionally, during operation, special purpose processor 240 includes data refresh timer 245. Data refresh timer 245 may be created using a hardware timer and/or a software timer that is a fixed function of a clock rate that is defined by the special purpose processor 240. When the data refresh timer 245 expires, an interrupt may be generated by the special purpose processor 240, and the special purpose processor 240 may initiate a safety system procedure. The special purpose processor 240 may initiate a safety system procedure by triggering the general purpose processor 210 to send a safety system initiation message throughout the reflective memory system 100, or by directly sending a safety system initiation message to one or more other computing devices 105 within the reflective memory system 100.

Bus 220 enables the communication and data transfer between the components of network element 200. Bus 220 may comprise a high-speed serial bus, parallel bus, internal universal serial bus (USB), Front-Side-Bus (FSB), a storage area network (SAN), and/or other suitable communication technology.

Network interface 230 is a computer hardware component that connects computing device 105 to a computer network. Network interface 230 may connect computing device 105 to a computer network via a wired or wireless connection. Network interface 230 may operate in conjunction with a wireless transmitter/receiver and/or transceiver (not shown) that is configured to operate in accordance with one or more wireless standards. The network interface 230 may also include one or more virtual network interfaces configured to operate with one or more software applications.

In various embodiments, a transmitter/receiver or transceiver (not shown) may be included with computing device 105. A transceiver may be a single component configured to provide the functionality of a transmitter and receiver. Accordingly, computing device 105 may be configured to convert digital data in to a radio signal or optical signal to be transmitted to one or more devices, and to capture modulated radio waves and/or optical signals to be converted into digital data. In embodiments where the network interface 230 operates in conjunction with a wireless transmitter/receiver and/or transceiver, the network interface 230 and/or the wireless transmitter/receiver and/or transceiver may be configured to operate in accordance with a Wireless Fidelity (Wi-Fi) standard such as the Institute of Electrical and Electronics Engineers (IEEE) 802.11a, IEEE 802.11b, IEEE 802.11g, IEEE 802.11ac, and/or IEEE 802.11n, voice over Internet Protocol (VoIP), Wi-MAX, Long Term Evolution (LTE), the Bluetooth standard, and/or any other like wireless standards, including RF-based, optical (visible/invisible), and the like.

In various embodiments, a communications port (not shown) may be included with computing device 105. In embodiments where the network interface 230 operates in conjunction with a communications port, the network interface 230 and/or the communications port may be configured to operate in accordance with a wired communications protocol, such as a serial communications protocol (e.g., the Universal Serial Bus (USB), FireWire, Serial Digital Interface (SDI), and/or other like serial communications protocols), a parallel communications protocol (e.g., IEEE 1284, Computer Automated Measurement And Control (CAMAC), and/or other like parallel communications protocols), and/or a network communications protocol (e.g., Ethernet, token ring, Fiber Distributed Data Interface (FDDI), and/or other like network communications protocols).

Figure 3A:
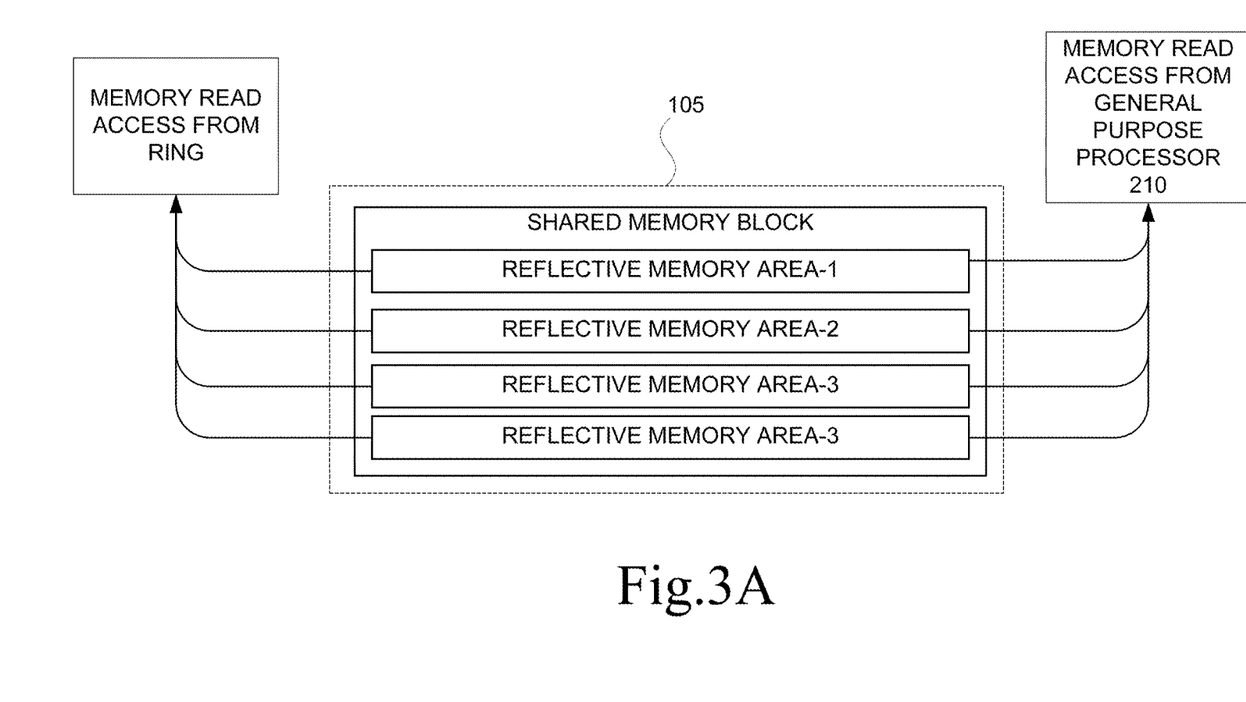
FIG. 3A illustrates read access permissions of the computing devices within the reflective memory system of FIG. 1 according to an example embodiment.
Figure 3B:
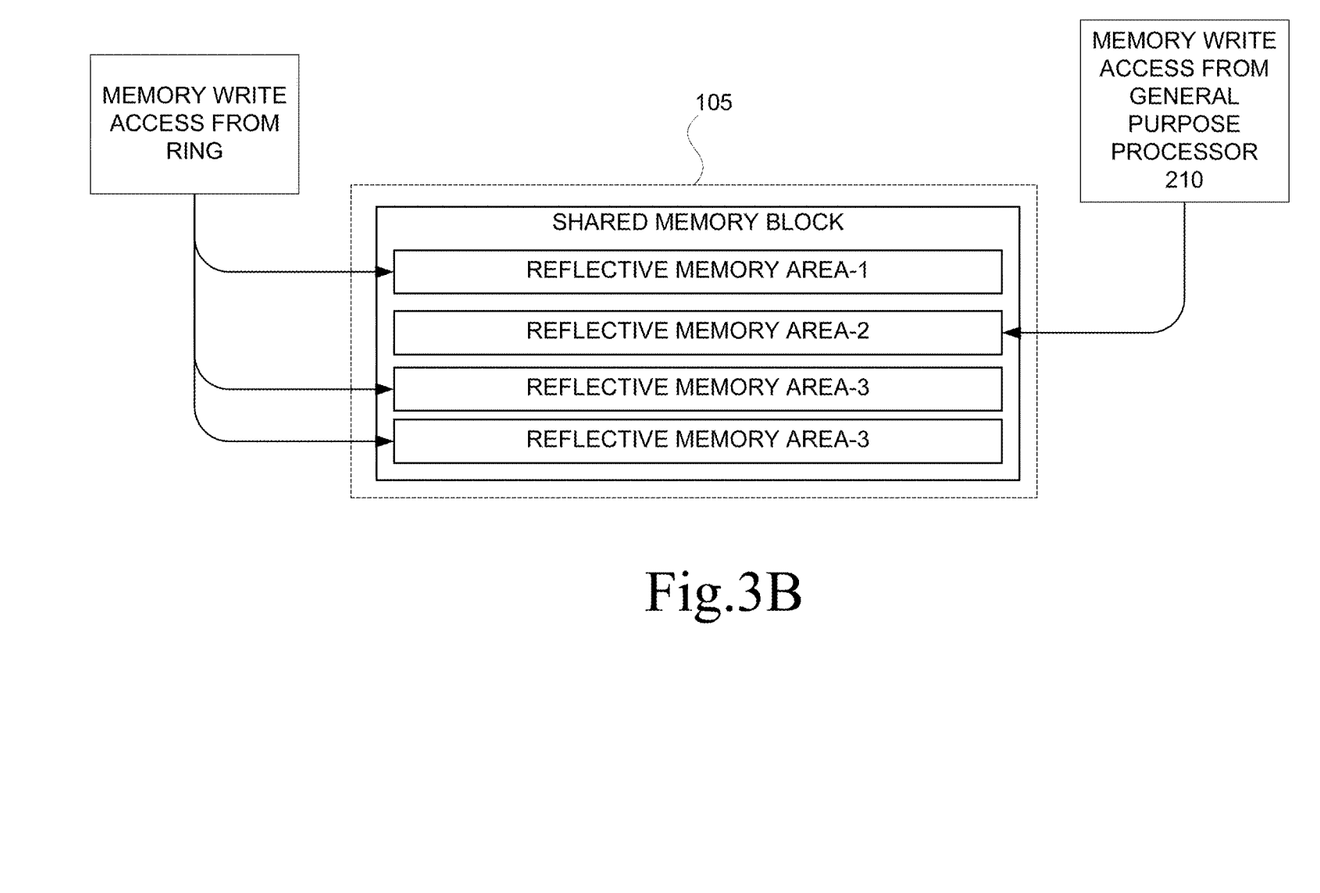
FIG. 3B illustrates write access permissions of the computing devices within the reflective memory system of FIG. 1.

FIG. 3A illustrates read access permissions of the computing devices within the reflective memory system of FIG. 1 according to an example embodiment. FIG. 3B illustrates write access permissions of the computing devices within the reflective memory system of FIG. 1.

Referring to FIG. 3A, each of the computing devices 105 of the reflective memory system 100 may read or otherwise access data from each of the plurality of reflective memory areas 261 of the shared memory block 260. Furthermore, the general purpose processor 210 may also read or otherwise access data from each of the plurality of reflective memory areas 261 of the shared memory block 260.

Referring to FIG. 3B, each of the computing devices 105 of the reflective memory system 100 may write data to a designated one of the plurality of reflective memory areas 261 of the shared memory block 260. Furthermore, the general purpose processor 210 may also write data to a designated one of the plurality of reflective memory areas 261 of the shared memory block 260. In this way, each of the computing devices 105 may write data generated by an associated data generating device 110 to a designated one of the plurality of reflective memory areas 261.

For example, the data generating device 110A-1 may be associated computing device 105-1 and may be designated to the reflective memory area-1 261. Thus, the general purpose processor 210 of computing device 105-1 may only write data generated by the data generating device 110A-1 to the reflective memory area-1 261 of the local version of the shared memory block 260 residing on the computing device 105-1, and may write the data generated by the data generating device 110A-1 to the reflective memory area-1 261 of the shared memory blocks 260 of the other computing devices 105 (e.g., computing device 105-2, computing device 105-3, and computing device 105-4).

It should also be noted that, in some embodiments, a data generating device 110 may be able to write data directly to its designated reflective memory area 261 in its associated computing device 105. For example, the data generating device 110A-1 may be able to write data directly to the reflective memory area-1 261 of the local version of the shared memory block 260 residing on the computing device 105-1 via the network interface 230.

Furthermore, in embodiments where a computing device 105 is associated with multiple data generating devices 110, that computing device 105 may be permitted to write data to multiple reflective memory areas 261. For example, the data generating devices 110A-1, 110B-1, and 110C-1 may be associated computing device 105-1. Additionally, the data generating device 110A-1 may be designated to the reflective memory area-1 261; the data generating device 110B-1 may be designated to the reflective memory area-2 261; and the data generating device 110C-1 may be designated to the reflective memory area-3 261. In such instances, the computing device 105-1 may be permitted to write data generated by data generating device 110A-1 to the designated reflective memory area-1 261; write data generated by data generating device 110B-1 to the designated reflective memory area-2 261; and write data generated by data generating device 110C-1 to the designated reflective memory area-3 261.

Figure 4:
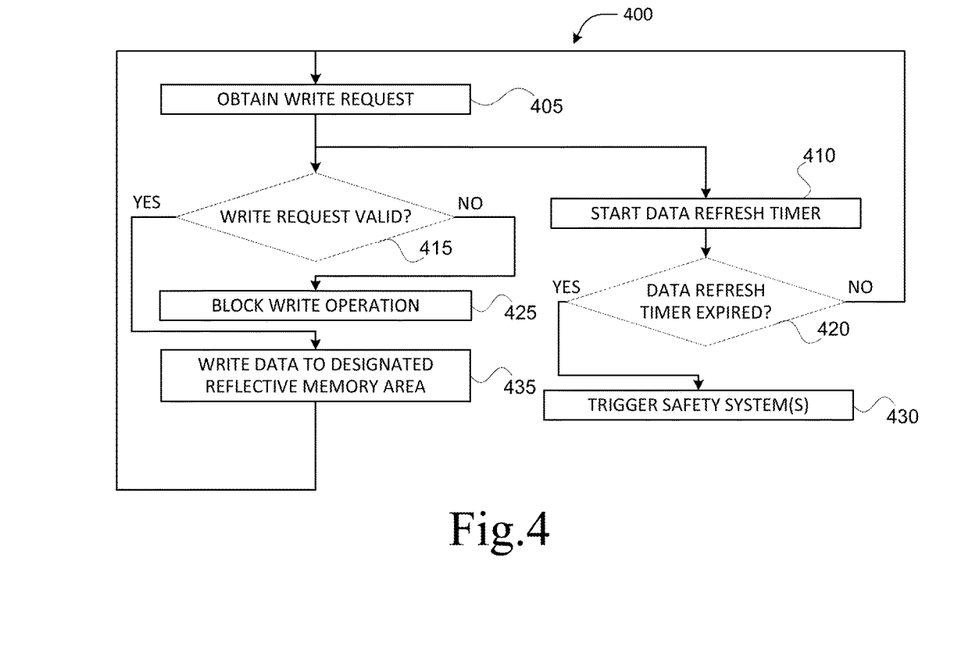
FIG. 4 illustrates an interception routine according to an example embodiment.

FIG. 4 illustrates an interception routine 400 according to an example embodiment. For illustrative purposes, the operations of interception routine 400 will be described as being performed by the special purpose processor 240 of one of the computing devices 105. It should be noted that any other hardware processing device that has a same or similar configuration as special purpose processor 240 may operate the interception routine 400.

As shown in operation S405, the special purpose processor 240 obtains a write request. As noted above, a write request may be issued by the general purpose processor 210 or another one of the computing devices 105 within the reflective memory system 100. In various embodiments, the special purpose processor 240 may be configured to intercept a write request issued from the general purpose processor 210, or intercept a write request issued by another one of the computing devices 105 via the network interface 230. In some embodiments, the special purpose processor 240 may be integrated with or otherwise placed within the computing device 105 in order to intercept the write request from the general purpose processor 210 and/or the network interface 230.

As shown in operation S410, the special purpose processor 240 starts or otherwise initiates the data refresh timer 245. The data refresh timer 245 may be initiated according to known methods for starting timers. It should be noted that, although the data refresh timer 245 is shown in FIG. 4 as being initiated subsequent to receiving the data write request, in various embodiments, the data refresh timer 245 may be initiated simultaneously with receiving the data write request.

As shown in operation S415, the special purpose processor 240 determines whether the received write request is valid or invalid. As noted above, the special purpose processor 240 is configured to determine that the write request is valid if the write request indicates to write data of a data generating device 110 to a designated one of the plurality of reflective memory areas 261. The special purpose processor 240 may be configured to determine that the write request is invalid if the write request indicates to write data of a data generating device 110 to any other non-designated one of the plurality of reflective memory areas 261.

If at operation S415 the special purpose processor 240 determines that the write request is not valid (or alternatively, invalid), then the special purpose processor 240 proceeds to operation S425 to block or otherwise prevent the data from being written to the shared memory block 260. If at operation S415 the special purpose processor 240 determines that the write request is valid, then the special purpose processor 240 proceeds to operation S435 to perform a write operation according to the write request by writing the data generated by the data generating device 110 to the designated reflective memory area 261 within the shared memory block 260.

Concurrently or simultaneously with operations S415-S435, as shown in operation S420, the special purpose processor 240 determines whether the data refresh timer 245 has expired. If at operation S420 the special purpose processor 240 determines that the data refresh timer 245 has not expired prior to data being written to the shared memory block 260, the special purpose processor 240 proceeds to operation S405 to obtain another write request. If at operation S420 the special purpose processor 240 determines that the data refresh timer 245 has expired prior to data being written to the shared memory block 260, the special purpose processor 240 proceeds to operation S430 to trigger or otherwise imitate a safety system procedure.

According to various embodiments, the data refresh timer 245 expiring prior to data being written to the shared memory block 260 may indicate that a fault, trip, or other like failure condition exists within the reflective memory system 100 or within a system or device associated with the reflective memory system 100. The term "trip" and/or "fault" (or alternatively "scram", and the like) may refer to any failure or compromise to a component, device, and/or system. Additionally, the safety system procedure may refer to any shutdown or deactivation procedure with respect to a desired component, device, and/or system.

As will be appreciated, the methods and apparatuses according the example embodiments have several advantages. First, the example embodiments provide an improvement over existing reflective memory protection systems. Second, the example embodiments provide a reflective memory system that alleviates the need for one or more processors to compare a reflective memory versus a local shared memory block. Third, the example embodiments provide hardware based reflective memory protection systems that allow for a diverse means of preventing memory corruption, and mitigates common cause failures due to software malfunctions.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed:

1. A computing device within a reflective memory system, the computing device comprising:
    a memory block including a plurality of memory areas, each of the plurality of memory areas being configured to store data of a corresponding one of a plurality of external devices; and
    a processor configured to,
        intercept a write request, the write request being associated with a first external device of the plurality of external devices, the first external device being associated with a first memory area of the plurality of memory areas,
        determine whether the write request is valid,
        write the data of the first external device to the first memory area if the determining determines that the write request is valid;
    the processor further configured to,
        initiate a data refresh timer based on intercepting the write request, and
        trigger a safety system based on a determination that the data refresh timer has expired prior to the data of the first external device being written to the first memory area, such that the writing the data of the first external device to the first memory area is ongoing concurrently with the data refresh timer being expired.

2. The computing device of claim 1, wherein in the determining, the processor is configured to:
    determine that the write request is valid if the write request indicates to write data of the first external device to the first memory area, and
    determine that the write request is invalid if the write request indicates to write data of the first external device to another one of the plurality of memory areas.

3. The computing device of claim 2, wherein the processor is further configured to:
    prevent the data of the first external device from being written to the first memory area if the determining determines that the write request is invalid.

4. The computing device of claim 2, wherein the processor is further configured to:
    transmit a second write request to a second computing device within the reflective memory system,
    the second computing device including,
        a second memory block including a second plurality of memory areas, each of the second plurality of memory areas being configured to store data of corresponding ones of the plurality of external devices, and
        a second processor configured to,
            intercept the second write request,
            determine whether the second write request is valid, and
            write the data of the first external device to a first memory area of the second plurality of memory areas if the determining determines that the second write request is valid.

5. The computing device of claim 4, wherein the first memory area of the second plurality of memory areas having a same memory address as the first memory area of the plurality of memory areas.

6. The computing device of claim 1, wherein the computing device further comprises:
    a separate processor, and in the intercepting, the processor is configured to obtain the write request from the separate processor.

7. The computing device of claim 6, wherein the computing device further comprises:
    a network interface, the computing device is connected to the first external device via the network interface, and the separate processor issues the write request based on data received from the first external device.

8. The computing device of claim 6, wherein the computing device further comprises:
a network interface, and in the intercepting, the processor is configured to obtain the write request from another computing device within the reflective memory system via the network interface.

9. The computing device of claim 8, wherein the separate processor is configured to:
obtain a read request from the other computing device, the read request indicating to read data from at least one of the plurality of memory areas; and
provide the data to the other computing device according to the obtained read request.

10. A method for writing data to a designated one of a plurality of memory areas in a memory block of a computing device within a reflective memory system, each of the plurality of memory areas being configured to store data of a corresponding one of a plurality of external devices, the method comprising:
intercepting, by a processor, a write request, the write request being associated with a first external device of the plurality of external devices, the first external device being associated with a first memory area of the plurality of memory areas;
determining, by the processor, whether the write request is valid;
writing, by the processor, the data of the first external device to a designated memory area if the determining determines that the write request is valid;
initiating a data refresh timer based on intercepting the write request; and
triggering a safety system based on a determination that the data refresh timer has expired prior to the data of the first external device being written to the first memory area, such that the writing the data of the first external device to the first memory area is ongoing concurrently with the data refresh timer being expired.

11. The method of claim 10, wherein the determining comprises:
determining that the write request is valid if the write request indicates to write data of the first external device to the designated memory area; and
determining that the write request is invalid if the write request indicates to write data of the first external device to another one of the plurality of memory areas.

12. The method of claim 11, further comprising:
preventing the data of the first external device from being written to the first memory area if the determining determines that the write request is invalid.

13. The method of claim 11, further comprising:
transmitting a second write request to a second computing device within the reflective memory system, the second computing device including a second memory block including a second plurality of memory areas, each of the second plurality of memory areas being configured to store the data of the corresponding ones of the plurality of external devices, and
the second write request indicating to write the data of the first external device to a first memory area of the second plurality of memory areas if a second processor of the second computing device determines that the second write request is valid.

14. The method of claim 13, wherein the first memory area of the second plurality of memory areas has a same memory address as the first memory area of the plurality of memory areas.

15. The method of claim 10, wherein the intercepting comprises:
obtaining, by the processor, the write request from a separate processor, the separate processor issuing the write request based on data received from the first external device.

16. The method of claim 15, wherein the intercepting comprises:
obtaining, by the processor, the write request from another computing device within the reflective memory system.

17. The method of claim 16, wherein,
the separate processor obtains a read request from the other computing device, the read request indicating to read data from at least one of the plurality of memory areas; and
the separate processor provides the data to the other computing device according to the obtained read request.

18. A reflective memory system comprising:
a first computing device including,
a first memory block including a first plurality of memory areas, each of the first plurality of memory areas being configured to store data of a corresponding one of a plurality of external devices, and
a first processor configured to,
intercept a write request, the write request being associated with a first external device of the plurality of external devices, the first external device being associated with a first memory area of the first plurality of memory areas,
initiate a first data refresh timer based on intercepting the write request,
determine whether the write request is valid,
write the data of the first external device to the first memory area if the determining determines that the write request is valid,
reset the first data refresh timer based on the data of the first external device being written to the first memory area, and
transmit the write request to a second computing device; and
the second computing device including,
a second memory block including a second plurality of memory areas, each of the second plurality of memory areas being configured to store data of corresponding ones of the plurality of external devices, and
a second processor configured to,
intercept the write request,
initiate a second data refresh timer based on intercepting the write request,
determine whether the write request is valid,
write the data of the first external device to a first memory area of the second plurality of memory areas if the determining determines that the write request is valid, and
triggering a safety system based on a determination that the data refresh timer has expired prior to the data of the first external device being written to the first memory area, such that the writing the data of the first external device to the first memory area is ongoing concurrently with the data refresh timer being expired,
the first memory area of the second plurality of memory areas having a same memory address as the first memory area of the first plurality of memory areas.

19. The computing device of claim 1, wherein the triggering includes initiating a shutdown of at least one external device, such that the at least one external device is deactivated.

20. The method of claim 10, wherein the triggering includes initiating a shutdown of at least one external device, such that the at least one external device is deactivated.

* * * * *